Sept. 10, 1963     J. V. MILEWSKI ETAL     3,103,406
METHOD OF MAKING LOW DENSITY EPOXY RESIN COMPOSITION
Filed Oct. 14, 1960

INVENTORS:
ERVIN G. EGBERT
JOHN V. MILEWSKI
BY
Curtis, Morris & Safford
ATTORNEYS.

United States Patent Office 3,103,406
Patented Sept. 10, 1963

3,103,406
METHOD OF MAKING LOW DENSITY EPOXY
RESIN COMPOSITION
John V. Milewski, Saddle Brook, and Ervin G. Egbert, Rockaway, N.J., assignors to Thiokol Chemical Corporation, Bristol, Pa., a corporation of Delaware
Filed Oct. 14, 1960, Ser. No. 62,565
6 Claims. (Cl. 18—48)

This invention relates to the production of low density, porous epoxy resin compositions and more particularly to a method of making porous epoxy resin compositions having a more finely porous structure and a more nearly uniform porosity than the compositions heretofore available.

In the manufacture of rocket motors a need exists for a moldable plastic material that has both very low density and an ability to resist deformation when subjected to heavy compressive stresses. Light weight is an obvious requirement of any material that is to be used in a rocket motor. In the case of solid propellant rocket motors, various structural elements within the motor casing, other than the propellant itself, are made of plastic materials, and it is desirable that these materials remain dimensionally stable at the pressures generated in the casing during firing of the rocket, i.e., 1000 to 2000 p.s.i.

It has been previously suggested that suitable porous materials for this purpose can be made by mixing with the liquid epoxide resin a quantity of "micro balloons" and curing the resulting mixture to form a porous solid. Micro balloons are extremely small thin-walled hollow spheres made of a suitable plastic such as a phenolic or urea resin. They can be produced in a size range of the order of 5 to 90 microns.

In carrying out this previously proposed process, difficulties have been encountered due to the inclusion of air in the mixture. As the liquid resin is mixed with the micro balloons and a suitable activator for curing the resin, air is incorporated in the mixture. The air forms bubbles of substantially larger diameter than the micro balloons, and thus the cured product has a non-uniform porosity which varies from batch to batch. Also the large pores formed by the air bubbles increase the deformability of the product under pressure and decrease its physical strength. These problems are particularly acute in cases where the material is to be cast into configurations that are several inches thick.

It is accordingly an object of the present invention to provide an improved process for making porous epoxy resin compositions. It is another object of the invention to provide a process for making such compositions having more nearly uniform porosity than has heretofore been obtained. It is still another object of the invention to provide a process for making an epoxy resin composition of this type that is more finely porous than the prior compositions. It is a further object of the invention to provide a method for effectively removing air from such a composition prior to curing. It is a still further object of the invention to provide an epoxy resin composition that can be cast in relatively thick sections having uniformly fine pores. Other objects of the invention will be in part obvious and in part pointed out hereafter.

The objects and advantages of the present invention are achieved in general by preparing a mixture of epoxy resin, activator and micro balloons in essentially the same manner as in the prior process referred to above, and then especially treating the resulting mixture to remove air bubbles therefrom prior to curing. The liquid epoxide resin used desirably has epoxide equivalent of 150 to 250 and a room temperature viscosity of 5000 to 15,000 centipoises. Any of the commercial epoxy resins having these properties may be used. One suitable liquid epoxy resin is sold under the trade name Epon 828 and is believed to be a reaction product of epichlorohydrin and bisphenol-A.

The activator used for curing the epoxy resin composition should desirably be one that gives a relatively long pot life, say greater than three hours at room temperature, and a slow exotherm. Such activators are commonly low molecular weight compounds having two or more reactive groups, such as hydroxyl, amine or carboxyl groups and are well known in the art. Any of the commercially available activators which give a long pot life can be used in the present process. Examples of such activators are Activator "D" and Activator "Z" sold by Shell Chemical Compony. Such activators are commonly used in the proportions of 5 to 25 parts by weight per 100 parts of epoxy resin.

In like manner any of the commercially available micro balloons may be used in the present process. One satisfactory type of micro balloons is sold under the trade designation BJO-0930 by Bakelite Division of Union Carbide Corporation. The micro balloons are used in the proportion of 20 to 50 parts by weight per 100 parts by weight of epoxy resin.

In preparing the mixture of resin and micro balloons, the resin is desirably heated to a temperature of 160° to 180° F. to reduce its viscosity. The liquid resin is mixed in a suitable mixer with the micro balloons and the activator incorporated in the mixture in the usual proportions. The mixture is then formed into a relatively thin layer in any suitable manner such as being placed in a flat tray, and the tray is vibrated at a frequency of 20 to 80 cycles per second to cause air bubbles to rise to the upper surface of the mixture. During vibrating of the material a blast of hot air is directed on its upper surface to break the air bubbles reaching the upper surface thereof. The length of time that the material is vibrated is determined by such factors as the viscosity of the resin and the relative amounts of the resin and micro balloons used. Ordinarily vibration for a period of say 15 minutes to one hour will result in nearly complete elimination of air bubbles.

At the end of the vibration period the material is allowed to cool to a temperature that is preferably not substantially above 110° F., and is then poured into a mold having the desired configuration and cured under standard curing conditions for the epoxy resin used. Typical curing conditions are set forth in the specifice example given hereafter.

The process of the invention may be carried out in conventional and well-known apparatus, for example, the apparatus diagrammatically illustrated in the accompanying drawing. In the drawing.

Figure 1:
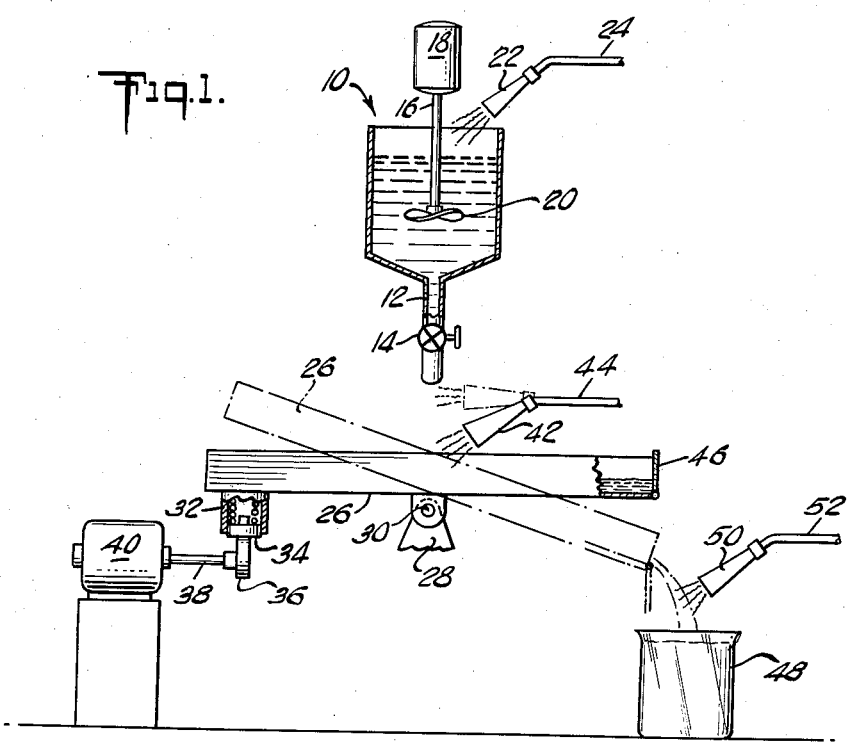
FIGURE 1 shows a mixing tank and vibrating tray capable of being used to carry out the mixing and vibrating steps of the process.

Referring to the drawing and more particularly to FIGURE 1, the numeral 10 designates an open-top mixing tank having a discharge pipe 12 provided with a valve 14. Extending into the tank there is a drive shaft 16 driven by a motor 18 and having at its lower end a mixing blade 20. Located above the top of tank 10 there is an air nozzle 22 supplied with hot air through a supply pipe 24. The nozzle 22 is so positioned in relation to tank 10 as to direct a blast of hot air against the surface of a body of material being mixed in the tank.

Beneath the discharge pipe 12 there is a horizontally arranged tray 26 mounted on a support 28 through a pivot 30. Vibration of the tray 26 is effected by mechanism associated with the left end thereof as shown in FIGURE 1. More particularly, a cylinder 32 containing a spring-opposed piston 34 is affixed to the bottom of the left end of tray 26. Reciprocating motion of piston 34 to vibrate the tray is effected by means of an eccentric cam 36 which bears against the lower surface of the piston and is mounted on a horizontal rotating shaft 38 driven by the motor 40. Located above the tray 26 there is an air nozzle 42 supplied with hot air through a pipe 44. As indicated in FIGURE 1, nozzle 42 can be directed either toward a stream of the process material as it flows from discharge pipe 12 to the tray 26 or toward the material as it is being vibrated in the tray. It will be evident that more than one hot air nozzle 42 can be used if necessary to make sure that substantially the entire upper surface of the material in the tray is subjected to the hot air blast.

When the vibrating step is completed, the process material is discharged by manually tipping tray 26 as indicated by the phantom lines in FIGURE 1. The tray 26 has a hinged right end 46 which can be lowered to cause the process material to flow into a mold 48. An air nozzle 50 having a supply pipe 52 is mounted to direct a blast of hot air against the material as it flows from the tray to the mold.

Figure 2:
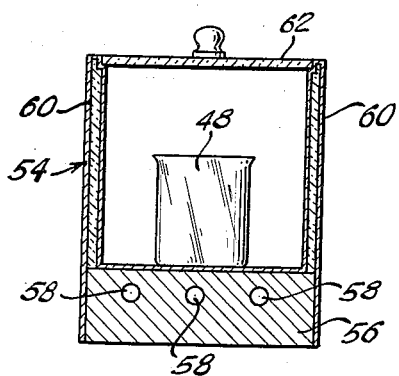
FIGURE 2 shows an oven for curing the de-aerated product.

Referring to FIGURE 2, the mold 48 containing the process material is placed in a curing oven 54. As shown in FIGURE 2, the oven comprises a base 56 containing the electrical heating elements 58, the insulated walls 60 and a removable cover 62. Illustrative curing conditions are given in the specific example set forth hereafter.

Figure 3:
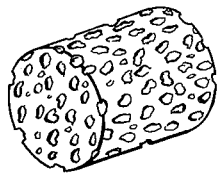
FIGURE 3 illustrates the appearance of the cured product when the vibrating and air-blasting steps of the present process are omitted.
Figure 4:
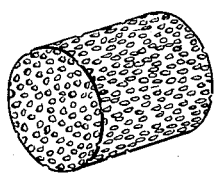
FIGURE 4 illustrates the appearance of the cured mass when these two steps are included.

The appearance of the cured material made with and without use of the vibrating and air blasting steps employed in the present process is shown in FIGURES 3 and 4, respectively. As shown in FIGURE 3, when these two steps are omitted, a product having a substantial variation in pore size is obtained, including not only the pores of desired size formed by the micro balloons but also relatively large pores formed by air bubbles. The disadvantages of such air bubbles have been pointed out above. The cured product shown in FIGURE 4 has pores substantially uniform in size, the size of the pores being essentially determined by the diameters of the microballoons initially mixed with the resin. Comparative data on the size and distribution of pores in products obtained when using the prior process and the present process are given in Table I below.

In order to point out more fully the nature of the present invention, a specific illustrative example of the present process will now be given.

100 parts of the epoxy resin sold under the trade name Epon 828 were placed in a bladed mixer and heated to 170° F. 25 parts by weight of BJO–0930 micro balloons were added thereto and mixed therewith for 10 minutes. 9 parts by weight of Shell activator "D" were then added to the mixture and incorporated therein.

Upon completion of the mixing step, the mixture was poured into flat trays to a depth of about ½" and the trays were vibrated for approximately 30 minutes at a frequency of 60 cycles per second. During the vibration of the material a blast of hot air at a temperature of about 400° to 500° F. was directed against the upper surface of the material at several spaced intervals for short periods of time to cause the air bubbles accumulating at the surface of the material to be broken.

At the end of the vibration period the material was allowed to cool to 115° F. and then charged into a mold. Transfer of the material into the mold was effected by tilting the trays to allow the material to flow slowly into the mold and avoid entrapment of air during this transfer. Curing of the material in the mold was effected by maintaining it at 90° to 100° F. for a period of 12 hours followed by a post cure for one hour at 160° F. and two hours at 200° F.

The resulting product when removed from the mold was characterized by extremely fine and nearly uniform porosity. It had a density of .025 pound per cubic inch. Its volumetric compression at 1000 p.s.i. and 140° F. was only 1.2%, and it exhibited a compression strength of 2000 p.s.i.

In order to determine the extent to which air bubble formation is reduced by the present process, the bubbles at the surface of a sample made according to the foregoing procedure were counted and compared with the number of surface bubbles of a similar sample prepared without using the vibrating and heat blasting steps described above. The results are given in Table I below wherein the size distribution of the bubbles is set forth.

*Table I*

| Bubble diameter in inches | Bubbles/in.$^2$, prior process | Bubbles/in.$^2$, present process |
|---|---|---|
| ⅛ | 3 | 0 |
| 3⁄32 | 5 | 0 |
| 1⁄16 | 20 | 4 |
| 1⁄32 | 20 | 10 |
| 1⁄64 | 10 | 15 |

Thus by using the present process a product is obtained which is much more finely porous than those previously available. Moreover a firmer product with increased strength is achieved.

It is of course to be understood that the foregoing example is illustrative only and that numerous changes can be made in the ingredients, proportions and conditions specifically set forth therein without departing from the spirit of the invention as set forth in the appended claims.

We claim:

1. In a method of making a low density, epoxy resin composition by mixing a liquid epoxide resin with plastic micro balloons and an epoxy resin activator and curing the resulting mixture to form a low density, finely porous solid, the steps of forming the mixture prior to curing into a thin layer, vibrating the mixture in thin layer form to cause air bubbles to rise to the surface thereof and impinging a blast of hot air on the upper surface of said layer to break the air bubbles reaching said upper surface.

2. The method of making a low density, porous, solid epoxy resin composition comprising steps of mixing a liquid epoxy resin with a quantity of plastic micro balloons and an epoxy resin activator, forming the resulting mixture into a thin layer, vibrating the mixture in thin layer form to cause air bubbles to rise to the surface thereof, impinging a blast of hot air on the upper surface of said layer to break the air bubbles reaching said upper surface and then curing the mixture to form said finely porous solid.

3. A method according to claim 2 and wherein said micro balloons are added to the extent of 10 to 50 parts by weight per 100 parts epoxy resin.

4. A method according to claim 2 and wherein said thin layer of mixture is vibrated at a frequency of 20 to 80 cycles per second.

5. A method according to claim 2 and wherein said mixture is formed at a temperature of 160° to 180° F.

6. The method of making a low density, porous, solid epoxy resin composition comprising the steps of mixing a liquid epoxy resin with from 10 to 50 parts by weight of plastic micro balloons per 100 parts of liquid epoxide and 5 to 25 parts of an epoxy resin activator, heating the resulting mixture prior to curing and forming it into a thin layer, vibrating the mixture in thin layer form at a frequency of 20 to 80 cycles per second to cause air bubbles to rise to the surface thereof, impinging a blast of hot air on the upper surface of said layer to break the air bubbles reaching said upper surface, molding the deaerated mixture into a predetermined form and curing the molded material to form said finely porous solid.

References Cited in the file of this patent

UNITED STATES PATENTS

| | | |
|---|---|---|
| 1,079,563 | Knight | Nov. 25, 1913 |
| 1,157,149 | Conger | Oct. 19, 1915 |
| 1,819,888 | Gabel | Aug. 18, 1931 |
| 2,018,192 | Sexton | Oct. 22, 1935 |
| 2,200,155 | Camp et al. | May 7, 1940 |
| 2,320,341 | Bowes | June 1, 1943 |
| 2,327,001 | Schott | Aug. 17, 1943 |
| 2,444,626 | Bixby | July 6, 1948 |
| 2,461,723 | Cowan | Feb. 15, 1949 |
| 2,485,857 | Bower | Oct. 25, 1949 |
| 2,975,486 | Kenyon | Mar. 21, 1961 |